UNITED STATES PATENT OFFICE.

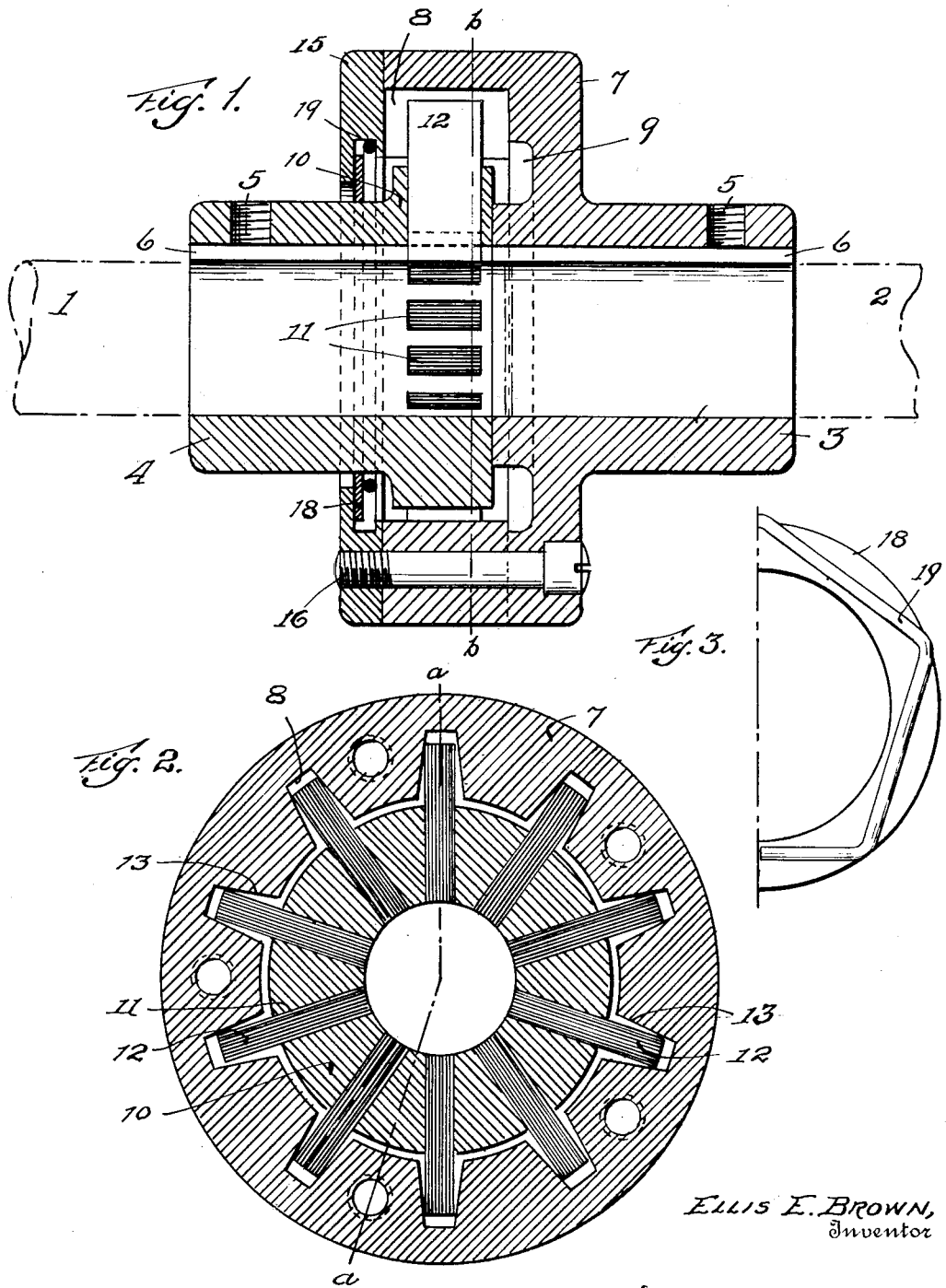

ELLIS E. BROWN, OF READING, PENNSYLVANIA.

FLEXIBLE COUPLING.

1,328,366.  Specification of Letters Patent.  Patented Jan. 20, 1920.

Application filed July 21, 1919. Serial No. 312,410.

*To all whom it may concern:*

Be it known that I, ELLIS E. BROWN, a citizen of the United States, residing at Reading, in the county of Berks and State of Pennsylvania, have invented certain new and useful Improvements in Flexible Couplings, of which the following is a specification.

This invention relates to improvements in flexible couplings, and it is intended more particularly for use as a shaft coupling.

The object in the present instance is to provide a coupling of comparatively simple structure, in which an appreciable, independent rotary movement is possible as between the driving and the driven member, and this is accomplished in my present structure through the medium of a series of laminated spring members, arranged radially on the inner member and in engagement at their extremities with the outer member.

A further object is to provide a simple and effective means for maintaining the lubricant within the device, and I accomplish this by means of a spring backed gasket, conveniently housed in the cap member of the device.

The invention is more fully described in the following specification and clearly illustrated in the accompanying drawing, in which:—

Figure 1 is a sectional view of my device taken on the line $a$—$a$ of Fig. 2.

Fig. 2 is a sectional view thereof, taken on the line $b$—$b$ of Fig. 1.

Fig. 3 is a detail view showing a portion of the spring backed gasket.

The numerals 1 and 2 designate the ends of two shaft members (indicated by dotted lines) to which the coupling is to be applied.

The numeral 3 designates the outer member of the coupling and 4 the inner member of the coupling. Either of these members may be the driving member, while the other will be the driven member. Each member is secured to the shaft by means of a suitable set screw, through the tapped holes 5, and both members are formed with the usual key way 6.

For the purpose of description, we will designate the outer member 3 as the driving member. This member is formed with a sleeve portion for engagement by the shaft 2, and an enlarged portion 7, circular in contour, and provided with a series of projections, forming pockets in its inner wall, designated by the numeral 8. At the base of these pockets, in the body of the member, there is formed an oil reservoir 9.

The driven member 4, is also provided with a sleeve for engagement with the shaft 1, and with an enlarged inner end 10 forming a head, and this head is formed with a series of radiating openings 11, equal in number to and in radial alinement with the pockets in the outer member 3. In the openings 11 I secure resilient members 12, each being preferably made up in laminated form, and these members extend beyond the peripheral surface of the head 10 and enter the pockets 8 of the member 3. These pockets are formed with slightly inclined walls, 13, so that, when one member of the coupling is rotated, the other will be rotated also, but, the initial movement will be without jar or shock, for the reason that the combination of the resilient members 12 and the inclined pockets 8 will permit just that required adjustment as between the driving and driven members as will produce the best and most desired results. This resilient or "cushion" engagement between the two members will of course be maintained at all times, and as a consequence, the shaft will be relieved of that rigidity which is often so objectionable, while at the same time, the engagement is positive and the result satisfactory.

The numeral 15 designates a cap member, which encircles the shaft and also the sleeve of the member 4, and is held tightly against the open face of the member 3 by means of screws 16.

The inner face of this cap member is formed with an annular receptacle, and within this receptacle I place a metal ring or gasket 18, and this ring is backed by a spring 19, which tends to hold the gasket securely against the surface of the cap and prevent leakage of the lubricant from the reservoir. The spring member comprises a wire, bent to approximately a five-pointed contour, and it is split and set to insure the proper pressure against the gasket.

The resilient, laminated members 12 are preferably driven into the openings 11 so as to insure a tight fit, and they may or may not extend all the way into the bore of the sleeve.

It is evident that when my device is in action, the rotation thereof will, by reason of the centrifugal force created, tend to throw the lubricant toward the outer ends of the radiating, resilient members, that is, to the point where it is required, and it is thus that I am assured constant lubrication at these points as long as there remains any of the lubricant in the reservoir.

It is evident that with the simple structure thus described and shown, I am enabled to accomplish a very much desired condition in shaft coupling, for it is evident that misalinement of the two shaft members may be most pronounced and the coupling will adjust itself thereto, by reason of the radial spring members and the movement allowed them in the pockets 12. This connection between the driven and driving members being particularly free of movement in all directions, due to this series of radiating, laminated, spring members and their easy engagement in the tapered pockets, will insure a perfect coupling under what would otherwise be considered impossible conditions, because with this device, all ordinary "twist" or other misalinement will be nullified, in so far as a satisfactory coupling of the two members is concerned.

Having thus described my invention, I claim:—

1. In a flexible coupling, the combination of a driving and a driven member, one of which is formed with a plurality of pockets, and the other with a plurality of spring members adapted for engagement in said pockets, one member having an oil reservoir therein, and a closure cap for the reservoir, said cap having a spring backed closure gasket located therein.

2. In a flexible coupling, a driving member formed with a series of pockets in its inner wall and means for securing it to a shaft; a driven member having a series of radiating, laminated spring members adapted to engage the pockets in the driving member; and a closure cap for the driving member, said cap having an inner, annular receptacle, and a metal ring located therein, and a spring member adapted to hold said ring against the wall of the cap.

3. In a flexible shaft coupling, a driving member formed with a series of interior, equidistant pockets and an oil reservoir, with a driven member having a series of resilient radiating members carried thereby and adapted to engage the driving member through the pockets, and a spring backed closure for the oil reservoir.

4. A flexible shaft coupling comprising a driving and a driven member, the inner member having a series of radiating, resilient members and the outer member having a lubricant reservoir and means for engaging said radiating members, whereby the contacting surfaces of said radiating members with said engaging means are supplied with lubricant as long as there remains a supply in the reservoir.

5. A flexible shaft coupling comprising a driving member and a driven member, the outer member having a series of inwardly directed projections and means for securing it to a shaft, the inner member having a series of openings radiating from the axial center and laminated spring members secured in said openings and adapted to engage said projections.

6. A flexible shaft coupling comprising a driven member and a driving member, one member forming an oil reservoir and having projections on its inner surface and means for securing the member to a shaft, the other member having a series of radiating, resilient members whose outer extremities contact with said projections, whereby said contacting surfaces are constantly lubricated while the device is rotating and until the lubricant is exhausted.

In testimony whereof I affix my signature.

ELLIS E. BROWN.